Figure 1:
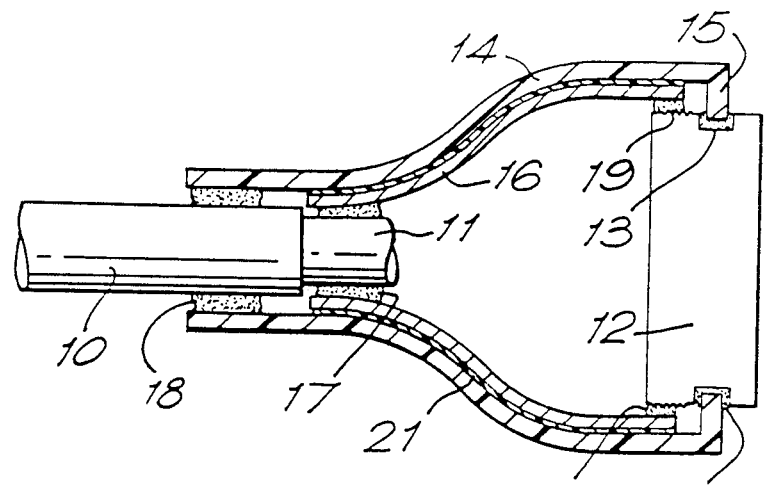

United States Patent [19]  
Gray et al.

[11] Patent Number: 4,766,267  
[45] Date of Patent: Aug. 23, 1988

[54] HEAT-SHRINKABLE ARTICLE

[75] Inventors: David R. Gray, Plympton; Michael J. Sleeman, S. Brent, both of England

[73] Assignee: Bowthorpe Hellermann Limited, Crawley, United Kingdom

[21] Appl. No.: 15,969

[22] Filed: Feb. 18, 1987

[30] Foreign Application Priority Data

Feb. 19, 1986 [GB] United Kingdom ............... 8604089

[51] Int. Cl.$^4$ ............................................. H02G 15/04
[52] U.S. Cl. .................................. 174/36; 174/35 C; 174/DIG. 8
[58] Field of Search .................. 174/35 C, 36, DIG. 8; 428/36; 204/192.15; 264/230, 342 R

[56] References Cited

U.S. PATENT DOCUMENTS

| 3,898,369 | 8/1975 | Clabburn | 174/36 |
| 4,201,649 | 5/1980 | Gillery | 204/192.15 X |
| 4,364,792 | 12/1982 | Gliem et al. | 204/192.15 X |
| 4,462,884 | 7/1984 | Gillery | 204/192.15 X |
| 4,525,261 | 6/1985 | Hotta et al. | 204/192.15 |
| 4,555,422 | 11/1985 | Nakamura et al. | 174/DIG. 8 |

FOREIGN PATENT DOCUMENTS 1259774 7/1972 United Kingdom ......... 174/DIG. 8

OTHER PUBLICATIONS

"Conductive Heat Shrinkable Plastic"; Insulation; Aug. 1969, p. 23.

Primary Examiner—Morris H. Nimmo  
Attorney, Agent, or Firm—Bert J. Lewen; Henry Sternberg

[57] ABSTRACT

A heat-shrinkable electrically shielding tubular article is provided with an electrically conductive lining on its inner surface, which lining is formed of a continuous coating of a metal which deforms without cracking during recovery so that after recovery the coating will remain continuous and adhered to the surface of the article. The coating may be formed of an alloy which softens without fully melting, at the recovery temperature of the article.

18 Claims, 1 Drawing Sheet

HEAT-SHRINKABLE ARTICLE

This invention relates to a heat-shrinkable tubular article having an electrically conductive lining on its inner surface, the article being intended to enclose the junction between an electric cable and a connector and the conductive lining serving as an electrical shield.

It has been a problem with such articles to provide a lining which is of sufficient electrical conductivity for its shielding purpose, but which will maintain its integrity when the article shrinks or recovers. In particular, metal coatings of adequate thickness for the shielding function have broken up as the article recovers.

In accordance with this invention there is provided a heat-shrinkable tubular article provided with an electrically conductive lining on its inner surface, which lining is formed of a continuous coating of a metal which deforms without cracking during recovery of the article so that after recovery the coating remains continuous and adhered to said surface of the article.

Preferably the metal of the coating exhibits a broad melting point so that it softens, without fully melting (i.e. without changing fully to a liquid phase), during recovery of the article.

The metal for the coating may be selected from a number of appropriate alloys. One appropriate alloy comprises bismuth, lead and tin (e.g. 50% bismuth, 25% lead and 25% tin). Another appropriate alloy comprises indium and bismuth (e.g. 95% indium and 5% bismuth). A further appropriate alloy comprises bismuth (e.g. 40%) and tin (60%). All the quoted percentages are percentages by weight.

The metal coating may be relatively thick (e.g. 0.5 mm) to achieve high values of electrical conductivity, yet because at the recovery temperature it is soft and deformable, it does not significantly resist shrinking of the article.

The metal coating may be applied to the surface of the heat-shrinkable article by means of any appropriate technique in accordance with known principles. It can enhance the adherence of the metal coating to the article to apply a thin priming layer to its surface before the metal coating is applied. One material which may be used for the priming layer comprises a polymeric material, e.g. polyvinyl acetate, and this may for example be applied in the form of a water-based emulsion which is then dried to result in a polymeric layer of e.g. 30 microns thickness. An another example, a metal e.g. silver may be used for a priming layer. Such a metal priming layer may be applied for example by sputter-coating (vacuum deposition) typically to a thickness of 1 micron. One appropriate technique for applying the deformable metal coating comprises spraying.

Figure 2:
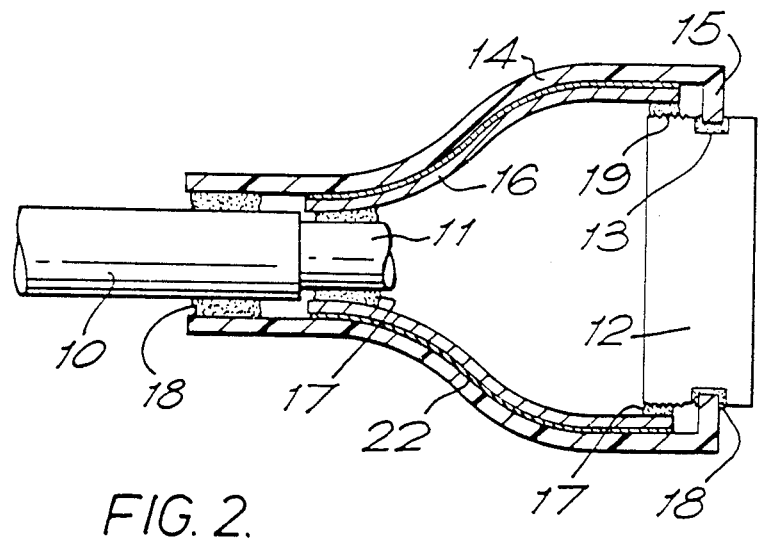

Embodiments of this invention will now be described by way of examples only and with reference to the accompanying drawings, in which:

FIG. 1 is a longitudinal section through a heat-shrinkable article or boot recovered about a cable and its connector; and FIG. 2 is a similar section through an alternative embodiment of boot recovered about a cable and its connector.

Referring to FIG. 1, a cable 10 is terminated by a connector component 12. The details of the connector component and of the termination of the cable conductors are not shown and do not form part of the invention. It is sufficient to note that the cable insulation is cut back a certain distance to expose a length of the screen 11 of the cable.

A heat-shrinkable boot 14 is shown recovered about the cable 10 and its connector component 12. The boot 14 is a tubular article of generally bottle-shape, with a narrower end recovered about the cable insulation and about a portion of the exposed cable screen 11, and a wider end recovered about the circumference or periphery of the connector component 12. In the example shown, the wider end of the boot is provided with an inturned rim or flange 15 which is received within a groove 13 formed around the periphery of the connector 12.

The boot 14 is provided with an electrically conductive lining 16 on its inner surface, extending from adjacent the wider end of the boot, over the larger-diameter section and the transition section and over just a portion of the smaller-diameter section. The lining 16 comprises a continuous coating of a metal which deforms without cracking upon recovery of the boot so that after recovery the coating remains continuous and adhered to the inner surface of the boot.

The metal for the coating 16 may be selected from a number of alloys which exhibit a broad melting point (i.e. they each change from solid to liquid phases in a progressive or gradual manner over a broad range of temperatures), so that the coating softens without fully melting at the recovery temperature of the boot. For example the metal of coating 16 may exhibit a broad melting point extending over a range of at least 15° C. and preferably at least 20° C. whilst the recovery temperature of the boot preferably lies within this range. One appropriate alloy comprises bismuth, lead and tin, generally in the proportions 40–60% bismuth, 20–30% lead and 20–30% tin, although more preferably 44–56% bismuth, 22–28% lead and 22–28% tin and most preferably 50% bismuth, 25% lead and 25% tin, the latter exhibiting a melting point extending from 97°–123° C. Another appropriate alloy comprises indium and bismuth, generally in the proportions 80–98% indium and 2–20% bismuth although more preferably 93–97% indium and 3–7% bismuth and most preferably 95% indium and 5% bismuth, the latter exhibiting a melting point extending from 125°–150° C. and providing a coating which is malleable at ambient temperatures. Another appropriate alloy comprises bismuth and tin, generally in the proportions 30–50% bismuth and 50–70% tin, although more preferably 35–45% bismuth and 55–65% tin and most preferably 40% bismuth and 60% tin, the latter exhibiting a melting point extending from 138–170° C. All these percentages are percentages by weight.

The metal coating 16 may have a thickness generally in the range of 0.2 to 2 mm, but preferably in the range 0.4 to 1 mm. Typically the boot 14 may have a wall thickness in the range of 0.5 to 2.5 mm and may for example have a length of the order of 5.5 cm, a diameter of 13 to 20 mm at its narrower end and a diameter of 35–45 mm at its wider end.

The material of the boot may be selected from a number of known plastics appropriate for forming heat-shrinkable articles and in the example shown in FIG. 1 comprises a cross-linked polyolefin. The boot is expanded in diameter, from its as-moulded condition, by a factor preferably in the range 2 to 2.5, although the expansion factor can be up to 4.

The boot of FIG. 1 has a relatively thin priming layer 21 of polymeric material disposed over its inner surface, the metal coating 16 being applied over this priming layer. The priming layer 21 may have a thickness generally up to 50 microns.

In order to manufacture the article shown in FIG. 1, the boot 14 is moulded and then undergoes expansion according to known techniques to render it capable of heat-recovery. Then in its expanded condition, the inner surface of the boot 14 receives its priming layer 21. In the example shown in FIG. 1 this comprises polyvinyl acetate and is applied in the form of a water-based emulsion for example by brushing, which is then dried to result in a polymeric layer of e.g. 30 microns thickness. Then the alloy coating 16 is applied in one or more layers to the desired thickness using any appropriate technique in accordance with known principles. One appropriate technique comprises spraying using selective masking.

FIG. 2 shows a boot 14 which differs from the boot shown in FIG. 1, only in that a metal priming layer 22 replaces the polymeric priming layer 21 shown in FIG. 1. This priming layer preferably comprises a precious metal (for example silver or gold) which may be applied to the inner surface of the boot 14 by sputter-coating (vacuum deposition), typically to a thickness of 1 micron, before the metal coating 16 is applied as described with reference to FIG. 1.

In use of the boot 14 of FIG. 1 or FIG. 2, the boot is positioned with its narrower end around the cable 10 and its wider end around the connector component 12. Just prior to applying the boot, the user may apply electrically conductive adhesive 17, 17 for example a conductive epoxy adhesive, over a knurled part 19 of the connector and over the exposed screen 11 of the cable, and insulating adhesive 18, 18, for example a hot melt or epoxy adhesive, over the groove 13 of the connector component 12 and over the cable sheath. Once the boot 14 is in position, heat is applied to it to cause it to shrink or recover for its narrower end to embrace the cable and its wider end to embrace the connector component 12 as shown in each of FIGS. 1 and 2. The boots 14 which have been described recover at a temperature which lies within the broad range of temperature over which the metal coating 16 changes from solid to liquid phase. Therefore, at the recovery temperature, the metal coating 16 has softened but not fully melted, and therefore deforms without cracking as the boot 14 shrinks in diameter. The metal coating retains its integrity and remains as a continuous layer adhered to the inner surface of the boot 14. For example, the boot may comprise a polyolefin recoverable at about 135° C. and an alloy coating of 95% indium and 5% bismuth and exhibiting a melting point extending from 125° to 150° C. (i.e. the alloy passes from solid to liquid phase gradually between 125° and 150° C.). However, in other examples, the boot may recover at a temperature towards the lower end of or even slightly below the broad melting point of the alloy coating: in practice during recovery of the boot sufficient heat is applied to raise its temperature above the recovery temperature and sufficient to soften the alloy.

The applied adhesive 17, 17 serves to adhere the cable screen 11 and connector to the coating 16 in order to enhance the electrical contact between the cable screen and connector, respectively, and the coating 16. The adhesive 18, 18 serves as a sealant between the cable insulation and connector, respectively, and the boot.

What is claimed is:

1. A heat-shrinkable tubular article provided with an electrically conductive lining on its inner surface, said lining being formed of a continuous coating of a metal which changes between solid and liquid phases over a broad range of temperatures, the article exhibiting a recovery temperature which lies within said broad range of temperatures so that the coating will soften without fully melting and deform without cracking during recovery of said article and, after recovery, remain continuous and adhered to said surface of the article.

2. A heat-shrinkable tubular article as claimed in claim 1, in which the broad range of temperatures extends over a range of at least 15° C.

3. A heat-shrinkable tubular article provided with an electrically conductive lining on its inner surface, said lining comprising a continuous coating of a metal having a thickness of at least 0.2 mm which will deform without cracking during recovery of the article so that, after recovery, the coating will remain continuous and adhered to said surface of the article.

4. A heat-shrinkable tubular article as claimed in claim 1 or 3, in which the metal of said coating comprises an alloy of bismuth, lead and tin.

5. A heat-shrinkable tubular article as claimed in claim 4, in which said alloy comprises 40–60% by weight of bismuth, 20–30% by weight of lead and 20–30% by weight of tin.

6. A heat-shrinkable tubular article as claimed in claim 5, in which said alloy comprises 44–56% by weight of bismuth, 22–28% by weight of lead and 22–28% by weight of tin.

7. A heat-shrinkable tubular article as claimed in claim 1 or 3, in which the metal of said coating comprises an alloy of indium and bismuth.

8. A heat-shrinkable tubular article as claimed in claim 7, in which said alloy comprises 80–98% by weight of indium and 2–20% by weight of bismuth.

9. A heat-shrinkable tubular article as claimed in claim 8, in which said alloy comprises 93–97% by weight of indium and 3–7% by weight of bismuth.

10. A heat-shrinkable tubular article as claimed in claim 1 or 3, in which the metal of said coating comprises an alloy of bismuth and tin.

11. A heat-shrinkable tubular article as claimed in claim 10, in which said alloy comprises 30–50% by weight of bismuth and 50–70% by weight of tin.

12. A heat-shrinkable tubular article as claimed in claim 11, in which said alloy comprises 35–45% by weight of bismuth and 55–65% by weight of tin.

13. A heat-shrinkable tubular article as claimed in claim 1 or 3, in which a relatively thin priming layer is disposed over said inner surface of the article and said metal coating is disposed over said priming layer.

14. A heat-shrinkable tubular article as claimed in claim 13, in which said priming layer comprises a polymeric material.

15. A heat-shrinkable tubular article as claimed in claim 14, in which said polymeric material comprises polyvinyl acetate.

16. A heat-shrinkable tubular article as claimed in claim 14, in which said priming layer has a thickness up to 50 microns.

17. A heat-shrinkable tubular article as claimed in claim 13, in which said priming layer comprises a precious metal.

18. A heat-shrinkable tubular article as claimed in claim 2 or 3, in which said metal coating has a thickness in the range of 0.2–2 mm.

* * * * *